March 4, 1969 D. J. CHRISTOPHER 3,431,458

VECTOR GENERATOR

Filed Sept. 1, 1967 Sheet 1 of 2

INVENTOR
DARYL J. CHRISTOPHER
BY Irving S. Rappaport
ATTORNEY

INVENTOR
DARYL J. CHRISTOPHER
BY Irving S. Rappaport
ATTORNEY

United States Patent Office 3,431,458
Patented Mar. 4, 1969

3,431,458
VECTOR GENERATOR

Daryl J. Christopher, Framingham, Mass., assignor to Raytheon Company, Lexington, Mass., a corporation of Delaware Filed Sept. 1, 1967, Ser. No. 664,968
U.S. Cl. 315—18 6 Claims
Int. Cl. H01j 29/72

ABSTRACT OF THE DISCLOSURE

A vector generator for generating vectors at desired writing rates comprising X and Y axis circuits for producing X and Y axis error functions and integrating means for insuring that the X and Y axis positional transfer is accomplished at the desired writing rate.

*Background of the invention*

The problem of vector generation in a rectilinear coordinate framework, such as a cathode ray tube with fixed X and Y deflection systems, is to simultaneously reduce the component differences to zero in a smooth and continuous manner which guarantees both the X and Y differences are reduced to zero simultaneously. Prior art vector generators are comprised of systems which result in an error in the end point which is proportional to the length of the vector drawn thereby making it necessary to delay the vector in a discrete discontinuous manner so as to reduce the size of the error. Further, many prior art generators require delay line averaging networks or their equivalents which generally preclude the use of integrated circuits. Such systems are usually also inflexible with respect to the time domain.

According to the present invention, the problems involved in vector generation including addition or subtraction, normalization and intensity control are solved in a unique manner, by allowing the rate of positional transfer to be the error function. Since this error function is only related to intensity, changes in this error function cannot cause the path of the electron beam of the cathode ray tube to deviate in any manner from the desired vector writing path. The present invention is susceptible to utilizing integrated circuits and has the capability of being implemented in either open or closed loop form. The present invention is characterized by the following factors and advantages: (1) self-determining writing time and a constant writing rate; (2) guaranteed terminal accuracy; (3) high reliability-minimum number of components; (4) easily adjusted wiriting speeds—permits the adaptation of this approach to a variety of display devices; (5) fully flexible coding—any coordinates may be specified without restrictions; (6) minimized storage requirements—only terminal coordinates are necessary in storage; (7) continuous function—there are absolutely no discontinuities in the output line regardless of length.

*Summary of the invention*

The above features and advantages of the present invention are achieved by providing a vector generator for generating vectors at any desired writing rate comprising X and Y axes circuits each including input means for receiving digital data, means for converting the digital data to analog signals, means for producing error rate functions from the analog signals, means for producing a single error rate function, and means for integrating the error rate function and applying the integrated signal to the converting means in each of the X and Y axes circuits to insure that the X and Y axis positional transfer is accomplished at the desired writing rate.

*Description of the preferred embodiments*

Figure 1:
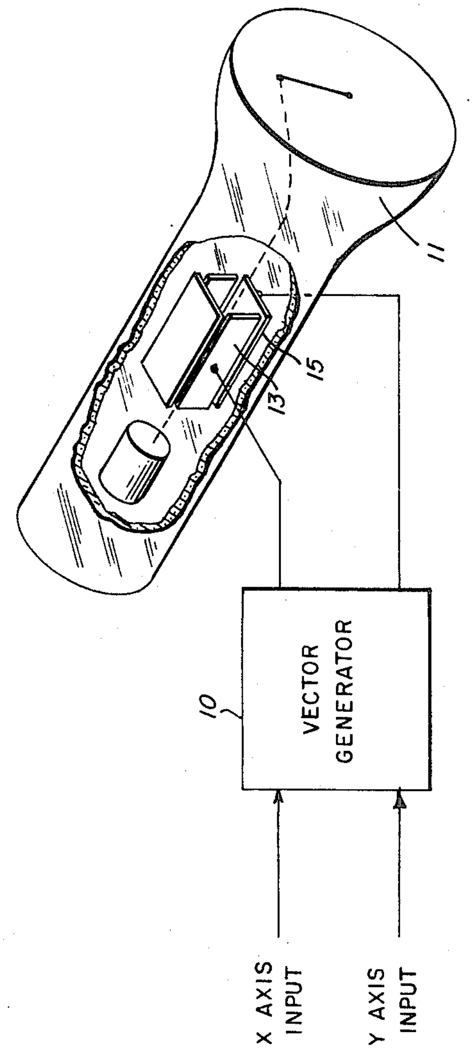
FIG. 1 shows a block diagram of the vector generator of the present invention.

FIG. 1 shows a vector generator 10 which is fed with X and Y axis input information. The outputs from generator 10 are applied to X and Y axis deflection plates 13 and 15 respectively of a cathode ray tube 11 on whose face the generated vector is displayed.

Figure 2:
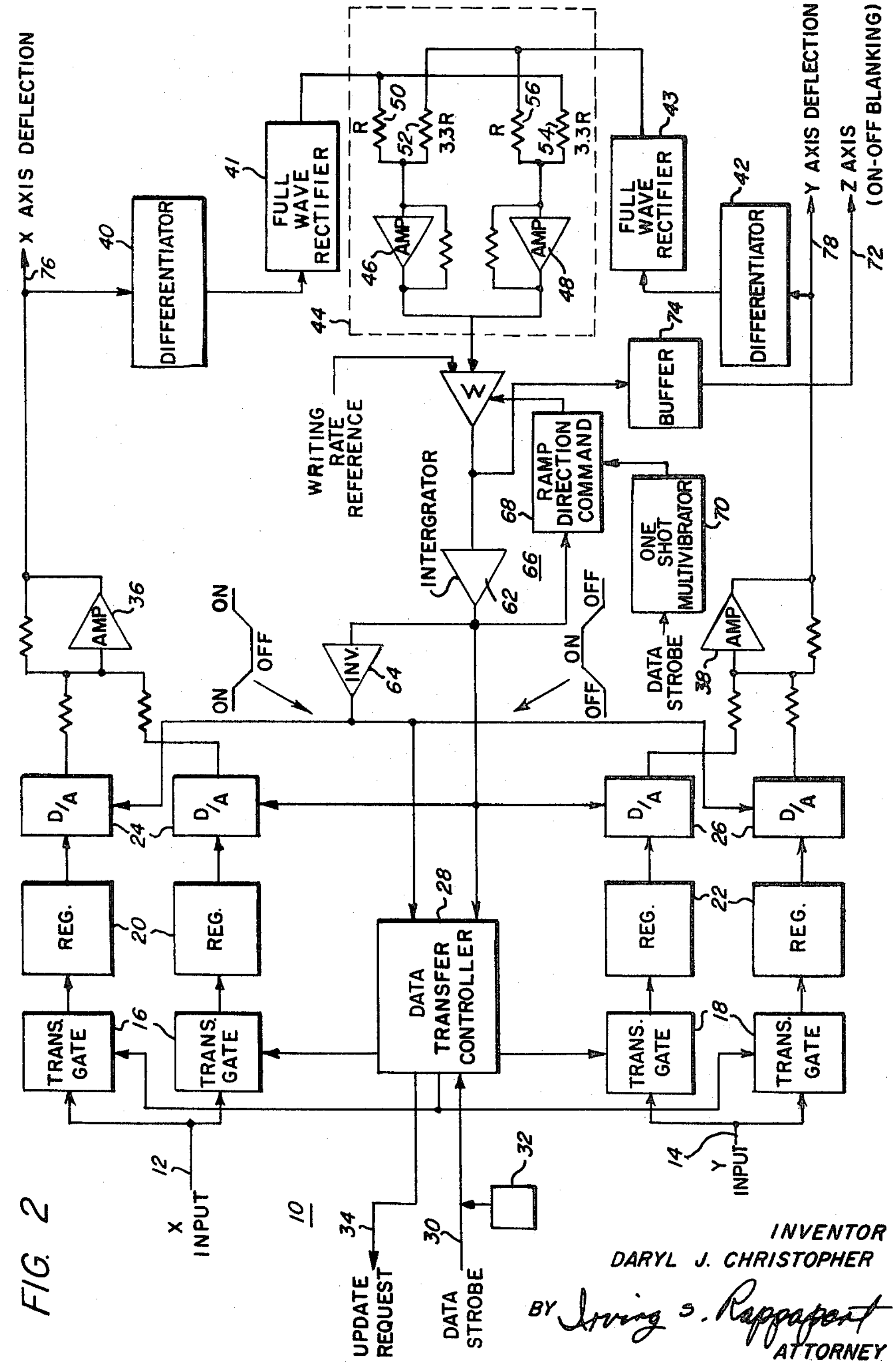
FIG. 2 shows a schematic diagram of the generator of FIG. 1.

A vector generator 10 is shown in FIG. 2 including an X axis input line 12 and an Y axis input line 14. The cathode ray tube (not shown) with which the vector generator 10 is employed accepts two 10-bit digital numbers so that each number consists of a 10-bit X axis component and a 10-bit Y axis component. The X and Y axis information is applied from input lines 12 and 14 to parallel pairs of 10-bit transfer gates 16 and 18. The outputs from each of the transfer gates 16 and 18 are fed to 10-bit storage registers 20 and 22 respectively whose outputs are applied to 10-bit digital-to-analog converters 24 and 26. Therefore, the X and Y axes channels each contain two digital-to-analog converters 24 and 26 respectively and appropriate storage registers 20 and 22 and transfer gates 16 and 18 respectively. The transfer of data is alternately steered into each of the registers 20 and 22 via the corresponding transfer gates 16 and 18. The steering function is provided by a data transfer controller 28 which may consist of a single flip-flop to provide an alternating control. The data transfer controller 28 is controlled by an input which includes a data strobe pulse applied on line 30 and operation is initiated from a one shot multivibrator 32 whose output is applied to line 30. The data strobe is a sync signal which determines when the transfer is to be made from the transfer gates to the registers. The one shot multivibrator 32 produces the initiating pulse which starts the operation of the generator. The data transfer control also has an output line 34 which carries an update request to the source of vector information after the last vector has been completed.

The outputs of each set of two digital-to-analog converters 24 and 26 respectively in each of the X and Y axes channels are summed in their own deflection amplifiers 36 and 38 respectively. The outputs from the amplifiers 36 and 38 are differentiated and full wave rectified in differentiators 40 and 42 and full wave rectifiers 41 and 43 respectively to provide a position rate control signal. The purpose of the differentiation and the full wave rectification is to change the ramp function output of the amplifiers 36 and 38 to a unipolar square wave which is to be utilized in the error rate feedback loop. The outputs of the full wave rectifiers 41 and 43 are applied to a major and minor rate selector shown in the dotted block 44.

The major and minor rate selector 44 includes a pair of parallel-connected operational amplifiers 46 and 48. The amplifier 46 is fed from the X axis channel via a resistor 50 having a value R and from the Y axis channel via a parallel-connected resistor 52 having a value 3.3R. The amplifier 48 is fed from the X axis via a resistor 54 having a value 3.3R and from the Y axis channel via a parallel-connected resistor 56 having a value R. The output from the selector 44 consists of 100% of the major axis position error rate and 34% of the minor axis position error rate. Since writing of the cathode ray beam trace should be slower than either the X and Y axes component signals and since the signal must be summed linearly, it is necessary only to correct errors in the range of 0 to 45°. While a truly constant writing beam intensity characteristic may be desirable, ideally practical variations of ±5% are acceptable. Accepting this ±5% intensity variation, a linear vector defined by $$(Z=(X^2+Y^2)^{1/2})$$

can be approximated by using 34% of the minor axis vector component and 100% of the major axis component. This automatic selection is accomplished by applying 100% of the major axis component signal and 34% of the minor axis component signal to one of the amplifiers 46 or 48 and 100% of the minor axis component signal and 34% of the major axis component signal to the other of the amplifiers 46 and 48 so that the output signal selection will be represented by 100% $dp/dt\ (x \text{ or } y)_{\text{max.}}$ + 34% $dy/dt\ (x \text{ or } y)_{\text{min.}}$ where $dp/dt$ is the position error rate.

The output from the selector 44 is combined with a writing rate reference control voltage 58 in a summing circuit 60.

The output from the summing circuit 60 is applied to an integrator 62 as an error function. The purpose of the integrator 62 which includes an output amplifier is to control the digital-to-analog converter source voltages in a complementary manner. The output from the integrator 62 is connected directly to the data transfer controller 28 and to one of each of the digital-to-analog converters 24 and 26. The output from the integrator 62 is also applied to the other ones of the digital-to-analog converters 24 and 26 via an inverter circuit 64. The error function signal from the integrator 62 determines the information transfer rate. The connection of the integrator to the digital-to-analog converters 24 and 26 assures that the X and Y axes positional transfer is accomplished at the desired writing rate which is constantly monitored via the feedback path. At any instant of time, one pair of digital-to-analog converters 24 and 26 will receive positive going transfer functions and the other pair of digital-to-analog converters 24 and 26 will receive negative going transfer functions. Since the data insertion to the digital-to-analog converters occurs at a time when its source voltage is zero volts, there is no necessity that the digital-to-analog converters have a high speed setup characteristic. The data which is inserted represents the new vector end point and the other digital-to-analog converter in the same channel is active during the alternate digital-to-analog converter's data transfer period and retains the position at the last reached vector end point.

A feedback path 66 is provided between the output of the integrator 62 and the summing circuit 60 in order to insure that the integrator 62 has a bipolar input signal. This feedback path 66 includes a ramp direction command circuit 68 which coordinates the unipolar signal from the summing circuit 60 so that a bipolar signal is applied to the integrator 62. The ramp direction command circuit 68 has the data strobe sync signal applied thereto via a one shot multivibrator 70 which applies the start command which activates the ramp direction command circuit 68 to coordinate whether the ramp signal is positive or negative going. A blanking signal to the Z axis is provided on line 72 which is connected to the output of the summing circuit 60 which passes through a buffer circuit 74. The blanking signal derived from line 72 provides the on-off blanking of the cathode ray tube trace. The outputs from the X and Y axes channels are applied via output lines 76 and 78 to the X and Y axes deflection circuits of the cathode ray tube respectively.

The operation of the vector generator 10 is as follows. The generator starting is controlled by the data strobe pulse on line 30 which allows data insertion into the digital-to-analog converters having zero volts applied thereto following the completion of writing of the last vector. The data strobe pulse on line 30 initiates the one shot multivibrator 32 timing cycle, which period is sufficiently long to insure the digital-to-analog converter settling time to the required level of accuracy, at which time the error channel loop is closed directionally, allowing the integrator 62 to send the ramp voltage in a direction opposite to its last action. Since the data insertion is occurring alternately into pairs of the digital-to-analog converters 24 and 26 in the form of new end points of vectors, data channel alternation is necessary. Because the X and Y axis source voltages are derived from a common source $f(Z)$ and the opposite or alternately used channel has as its function $1-f(Z)$, the time domain function is irrelevant except for its affect on the vector intensity. Thus, "path-ability," that is the ability of the vector to follow a linear path is independent of the position transfer function in the time domain. This characteristic is extremely important where vector drawing accuracies are required. Intensity variations invariably have a much larger acceptable variation in any system chracterization. During operation, the DC reference voltage on each of the digital-to-analog converters changes linearly during the writing time. The voltage on the last previous position goes from full reference voltage to zero while the voltage on the new position digital-to-analog converter goes from zero to full reference voltage. The sum of two outputs from the pair of X axis digital-to-analog converters 24 accordingly goes from the initial position to the final position linearly. The same linearity is also true with respect to the sum of the two outputs from the pair of Y axis digital-to-analog converters 26. If there is no change in the X position, the sum of the two output voltages remains constant as the ramp voltages go from full on to off and from off to full on respectively. (Shown by the signals from the output of the integrator 62.)

Although the vector generator 10 has been described in its preferred embodiment as being employed in a closed loop system, it may also be employed in an open loop system. The present invention as employed in an open loop system would have the loop broken at the integrator 62 and the necessary arithmetic calculation would be injected at the input to the integrator as the ramp function. Also, the preferred embodiment has been described as having an adjustable constant writing rate. On the other hand, if a precisely constant writing rate is desirable, then a balanced modulator-quadrature summer and a detector could be used to feed the error rate channel. The system is adaptable to a wide range of writing rates by simply changing the capacitance of the integrator. The shortest vector which may be written by the generator of the present invention is limited only by the bandwidth of the integrator and the writing rate selected.

Although the system described includes two dimensional coordinate systems, a third dimension could be added by employing a third axis data channel. Although the system has been described in conjunction with a cathode ray tube display, it could be employed in any type of cartesian coordinate system.

The circuits described in vector generator 10 including the transfer gates, registors, digital-to-analog converters, amplifiers, multivibrators, differentiators, rectifiers, the summing circuit, inverter and integrator are standard circuits for performing the various operations. Such circuits are shown and described in any standard electronics text such as "Electronic Fundamentals and Applications," Ryder, second edition, 1959.

It should be understood, of course, that the foregoing disclosure relates to only a preferred embodiment of the invention and that numerous modifications or alterations may be made therein without departing from the spirit and the scope of the invention as set forth in the appended claims.

I claim:

1. A vector generator for generating vectors at any desired writing rate comprising:

X and Y axes circuits each including:

input means for receiving digital data;
means for converting the digital data to analog signals;
means for producing error rate functions from the analog signals;
means for producing a single error rate function; and
means for integrating the error rate function and applying the integrated signal to the converting means in each of the X and Y axes circuits to insure that the X and Y axis positional transfer is accomplished at the desired writing rate.

2. A vector generator for generating vectors at any desired writing rate comprising:
X and Y axes circuits each including:
input means for receiving digital data;
means for converting the data to analog signals;
means for differentiating and rectifying the analog signal in order to produce error rate functions;
means for selecting the desired percentages of the X and Y error rate functions to produce a single error rate function;
means for summing the selected error rate function with a constant writing rate reference signal; and
means for integrating the signal from said summing means and applying the integrated signal to the converting means in each of the X and Y axes circuits to insure that the X and Y axis positional transfer is accomplished at the desired writing rate.

3. A vector generator for generating vectors at any desired writing rate comprising:
X and Y axes circuits each including:
input means for receiving digital data;
transfer means for steering data into each of said X and Y axes circuits;
storage means for storing the data;
conversion means for converting the data from digital to analog signals;
means for summing the outputs of said conversion means;
means for differentiating and rectifying the signal output from the summing means in order to produce X and Y axes error rate functions;
means for selecting the desired percentages of the X and Y error rate functions to produce a single error rate function;
means for summing the selected error rate function with a constant writing rate reference signal;
means for integrating the combined error rate function and reference signal; and
feedback means for applying the integrated error rate function to the conversion means in each of the X and Y axes circuits to insure that the X and Y axis positional transfer is accomplished at the desired writing rate.

4. The vector generator as set forth in claim 3 including means coupled to the outputs of said convension means for displaying the generated vector.

5. A vector generator for generating vectors at any desired writing rate comprising:
X and Y axes circuits including:
input means for receiving digital data;
a plurality of transfer gates connected to said input means for steering the data into each of said X and Y axes circuits;
a plurality of storage registers connected to said gates for storing the data;
a plurality of digital to analog converters connected to said registers for converting the data from digital to analog signals;
a summing amplifier connected to said converters for summing the outputs from said converters;
differentiating and full wave rectifying means connected to said amplifier for producing X and Y axes error rate functions;
a pair of parallel connected operational amplifiers having each of the X and Y axes error rate functions applied thereto for selecting the desired percentages of the X and Y error rate functions in order to produce a single error rate function;
a summing circuit connected to the output of said operational amplifiers for summing the selected error rate function with a constant writing rate reference signal;
an integrator connected to the output of the summing circuit for integrating the output signal;
feedback means for applying the integrated error rate function to the digital to analog converters in each of the X and Y axes circuits to insure that the X and Y positional transfer rate is accomplished at the desired writing rate; and
display means coupled to the output of said converters for displaying the generated vector.

6. A vector generator as set forth in claim 5 wherein; said operational amplifiers select 100% of the major axis signal and 34% of the minor axis signal whereby the output signal will be represened by 100% $dp/dt_{max.}$+34% $dp/dt_{min.}$ where $dp/dt_{max.}$ represents the positional rate of change along the major axis and $dp/dt_{min.}$ represents the positional rate of change along the minor axis.

References Cited

UNITED STATES PATENTS 3,333,147 7/1967 Henderson ---------- 315—23 X

RODNEY D. BENNETT, *Primary Examiner.*

T. H. TUBBESING, *Assistant Examiner.*

U.S. Cl. X.R.

315—23; 340—324